(12) United States Patent
Fujiwara et al.

(10) Patent No.: US 6,386,978 B1
(45) Date of Patent: *May 14, 2002

(54) VIDEO GAME WITH VARIABLE GAME SPACE DISPLAY REDUCTION RATIO

(75) Inventors: Hideyuki Fujiwara, Neyagawa; Koichi Takagami, Osaka, both of (JP)

(73) Assignee: Konami Co., Ltd., Kobe (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/195,363

(22) Filed: Nov. 18, 1998

(30) Foreign Application Priority Data

Nov. 20, 1997 (JP) .............................. 9-320183

(51) Int. Cl.$^7$ ................................. A63F 13/00
(52) U.S. Cl. ............................. 463/31; 463/6; 345/121; 345/131
(58) Field of Search .............................. 463/33, 32, 31, 463/6; 345/121, 131

(56) References Cited

U.S. PATENT DOCUMENTS 4,834,374 A * 5/1989 Nakamura et al. ............. 273/1
5,766,079 A * 6/1998 Kataoka et al. ................ 463/36
5,880,709 A * 3/1999 Itai et al. ..................... 345/113

FOREIGN PATENT DOCUMENTS

EP          0790583 A1 *  8/1997  ........... G06T/15/00
JP          09-069169      3/1997

* cited by examiner

*Primary Examiner*—Joe H. Cheng
*Assistant Examiner*—Julie Kasick
(74) *Attorney, Agent, or Firm*—Jordan and Hamburg LLP

(57) ABSTRACT

A video game system has a controller including a CPU which functions as a controller action detecting unit, a skiing control unit, and a display control unit. The controller action detecting unit detects whether each of first button and left and right trigger buttons on a manual controller is pressed or not. The skiing control unit controls the skiing of a downhill racer. The display control unit displays on a television monitor a video image in a game space which includes a downhill course as viewed from a viewpoint placed behind the downhill racer and a background composed of various models. When the display control unit displays the video image on the television monitor, it vertically reduces the size of the game space to compress and display an image within a vertical range that subtends a combined angle of elevation and depression which is greater than a combined angle of elevation and depression subtended vertically by the display screen of the television monitor. The combined angle of elevation and depression is determined using a speed at which the downhill racer is skiing.

11 Claims, 5 Drawing Sheets

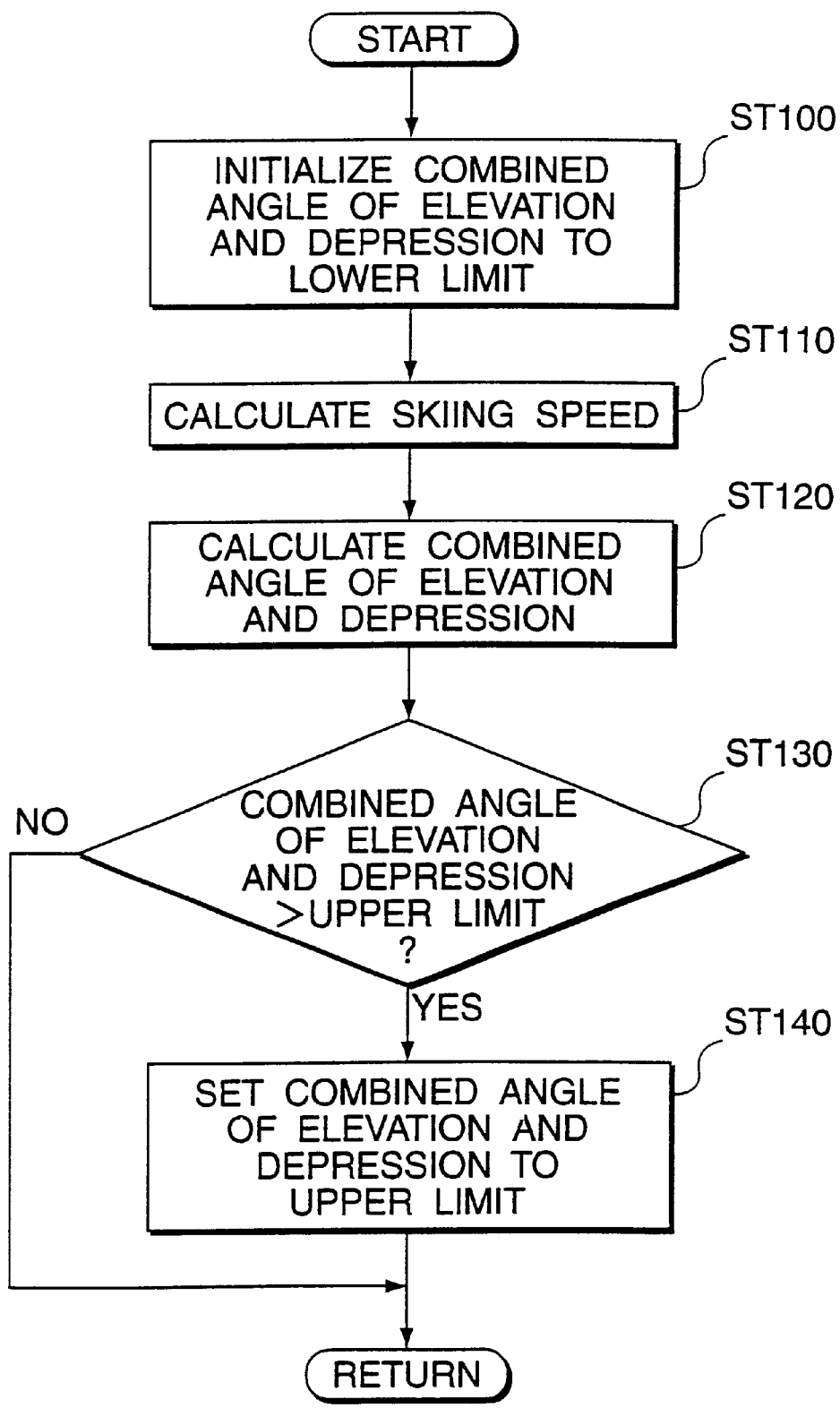

VIDEO GAME WITH VARIABLE GAME SPACE DISPLAY REDUCTION RATIO

BACKGROUND OF THE INVENTION

1. Field of the Invention

The present invention relates to a video game system using a cassette-type recording medium which may comprise an optical disk, a magnetic disk, or a semiconductor memory that stores program data, a method of controlling the display of images in a video game, and a recording medium that stores a program for controlling the display of images in a video game.

2. Description of the Prior Art

There have been proposed many video game systems. They include a system comprising a game machine for home use only and a television monitor, a system for use as an arcade game machine only, and a system comprising a personal computer or a work station, a display unit, and an audio output unit.

Either of these video game systems is constructed of a manual controller manually operable by the game player, a recording medium storing game program data, a CPU for controlling the generation of audio and image data based on the game program data, a video processor for generating video data, an audio processor for generating audio data, a CRT for displaying images based on the generated video data, and a speaker for reproducing sounds based on the generated audio data. The recording medium is often in the form of a CD-ROM, a semiconductor memory, a cassette with a built-in semiconductor memory, or the like.

One video game that can be played on such video game systems is a video game that simulates an alpine skiing game, for example, in which a displayed character simulates an alpine skiing racer, such as a downhill racer, for example, skiing down an alpine skiing course, such as a downhill course, in a game space to compete for a shortest course time.

It is desirable that such a video game be made more realistic by making the racer on the course appear to be skiing at speed in the game space.

SUMMARY OF THE INVENTION

It is therefore an object of the present invention to provide a video game system which is capable of making a character appear to be moving at speed in a displayed game space by vertically reducing a size of the game space.

Another object of the present invention is to provide a method of controlling a display of a game space in a video game to make a character appear to be moving at speed in the game space by vertically reducing a size of the game space.

Still another object of the present invention is to provide a recording medium which stores a program to control a display of a game space in a video game to make a character appear to be moving at speed in the game space by vertically reducing a size of the game space.

According to the present invention, a video game system displays a character which is movable relatively depthwise in a game space. The video game system has display means for displaying a game space, speed calculating means for calculating a speed at which a character in the game space moves, reduction ratio setting means for establishing a reduction ratio to reduce the game space vertically depending on the speed calculated by the speed calculating means, and display control means for controlling the display means to display the game space at the reduction ratio established by the reduction ratio setting means.

The game space is vertically reduced at the reduction ratio depending on the speed of the character, i.e., the image displayed in the game space is vertically decimated, and displayed by the display means. When the speed of the character increases, the reduction ratio is increased. As the character moves deeply into the game space, the background scenery in front of the character is rapidly expanded, resulting in an impressive game image in which the character looks moving at speed.

According to the present invention, there is also provided a method of controlling the display of images in a video game to display a character which is movable relatively depthwise in a game space. The method comprises the steps of displaying a game space at a reduction ratio to reduce the game space vertically as a character moves in the game space, calculating a speed at which the character in the game space moves, and increasing the reduction ratio when the calculated speed increases.

According to the present invention, there is further provided a recording medium storing a program for controlling the display of images in a video game to display a character which is movable relatively depthwise in a game space. The program comprises the steps of displaying a game space at a reduction ratio to reduce the game space vertically as a character moves in the game space, calculating a speed at which the character in the game space moves, and increasing the reduction ratio when the calculated speed increases.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 5 is a flowchart of a sequence for establishing a combined angle of elevation and depression for a range to be displayed.

DETAILED DESCRIPTION OF THE PREFERRED EMBODIMENT

Figure 1:
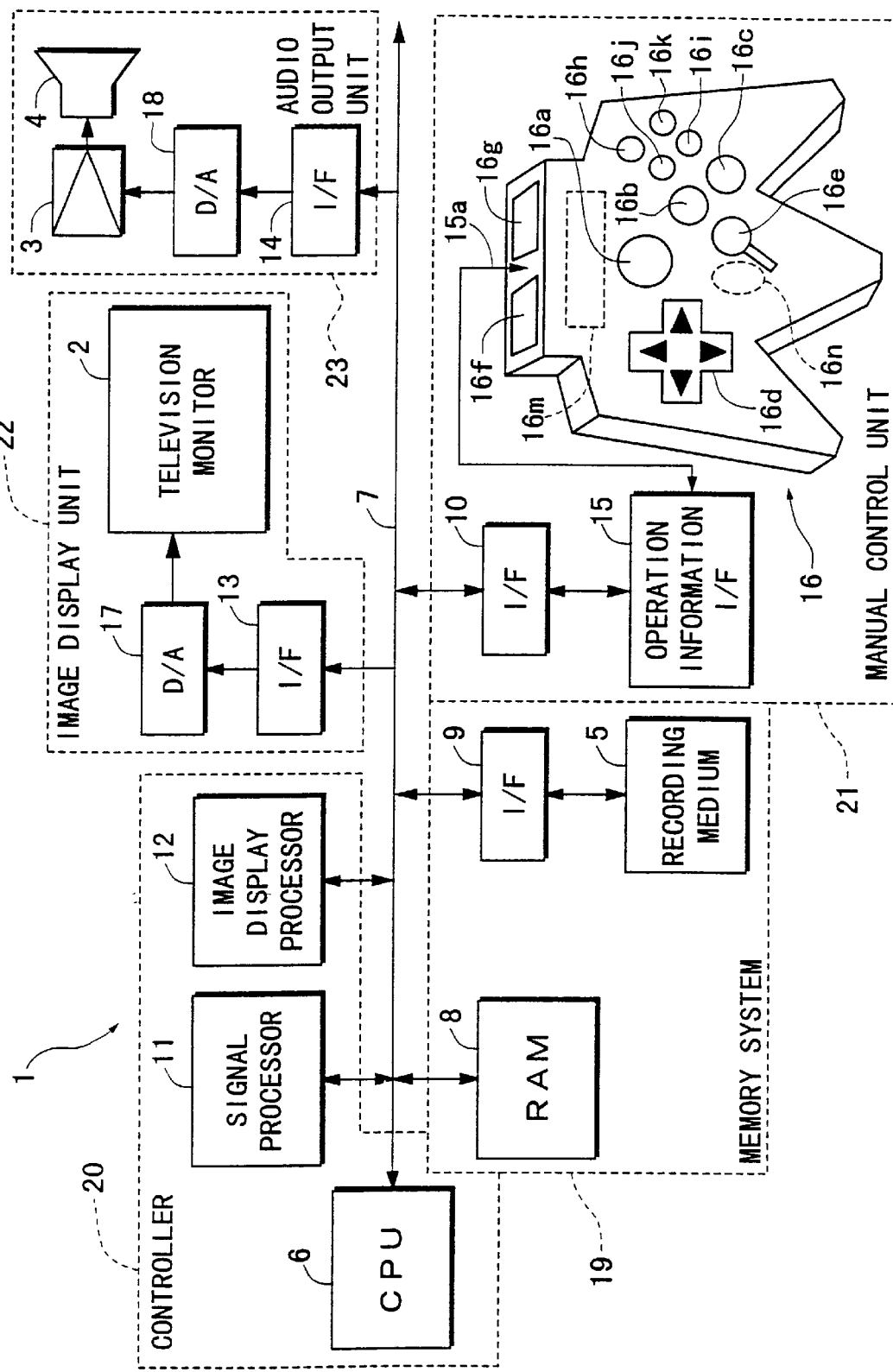
FIG. 1 is a block diagram of a video game system according to the present invention.

As shown in FIG. 1, a video game system 1 according to the present invention generally comprises a system housing (not shown), a television monitor 2 for displaying game images, an amplifier 3 and a speaker 4 for reproducing game sounds, and a recording medium 5 storing game data which comprise video data, audio data, and game program data. The recording medium 5 may comprise a ROM cassette in the form of a ROM storing the game data and program data including an operating system and housed in a plastic case, or an optical disk or a flexible disk.

The system housing accommodates therein a CPU 6 for controlling various components, a bus 7 connected to the CPU 6 and comprising an address bus, a data bus, and a control bus, a RAM 8 connected to the bus 7, an interface 9 connected to the bus 7, an interface 10 connected to the bus 7, a signal processor 11 connected to the bus 7, an image display processor 12 connected to the bus 7, and interfaces 13, 14 connected to the bus 7.

A manual controller 16, which is manually operable by the game player, is connected through an operation information interface 15 which is connected through the interface 10 to the bus 7. The interface 13, connected to the bus 7, is connected to a D/A converter 17 which is connected to the television monitor 2. The interface 14, connected to the bus 7, is connected to a D/A converter 18 which is connected to the amplifier 3 connected to the speaker 4.

The RAM 8, the interface 9, and the recording medium 5 jointly make up a memory system 19. The CPU 6, the signal processor 11, and the image display processor 12 jointly make up a controller 20 for controlling the progress of a video game, typically a target shooting game, played on the video game system 1. The interface 10, the operation information interface 15, and the manual controller 16 jointly make up a manual control unit 21. The television monitor 2, the interface 13, and the D/A converter 17 jointly make up an image display unit 22. The amplifier 3, the speaker 4, the interface 14, and the D/A converter 18 jointly make up an audio output unit 23.

The signal processor 11 mainly performs calculations for a three-dimensional space, calculations for conversion from positions in a three-dimensional space into positions in a pseudo-three-dimensional space, light source calculations, and generation and processing of audio data.

Based on calculated results from the signal processor 11, the image display processor 12 writes image data, to be displayed, into the RAM 8, e.g., texture data is written into an area of the RAM 8 which is designated by a polygon.

The manual controller 16 has a start button 16a, an A button 16b, a B button 16c, a cross key 16d, a stick-type controller 16e, a left trigger button 16f, a right trigger button 16g, a C1 button 16h, a C2 button 16i, a C3 button 16j, a C4 button 16k, a connector 16m, and a depth trigger button 16n.

A memory (not shown) for temporarily storing a progress status of the video game can removably be connected to the connector 16m.

The stick-type controller 16e is essentially identical to a joystick. Specifically, the stick-type controller 16e has a control stick which is usually held in an upstanding position and can be tilted from the upstanding position to a desired angular position about a pivot in any direction, including lateral and back-and-forth directions, within a 360° range. Depending on the direction in which and the angular position to which the control stick is tilted (hereinafter referred respectively as "tilted direction" and "tilted angle"), the stick-type controller 16e sends an X coordinate in the lateral direction and a Y coordinate in the back-and-forth direction (which is the vertical direction in FIG. 1), spaced from the upstanding position as an origin, through the interfaces 15, 10 to the CPU 6.

The video game system 1 may be in the form of an arcade game machine, a home game machine, or a computer.

If the video game system 1 is in the form of a home game machine, then the television monitor 2, the amplifier 3, and the speaker 4 are separate from the system housing. If the video game system 1 is in the form of an arcade game machine, then all the component shown in FIG. 1 are accommodated in a single unitary casing.

If the video game system 1 is in the form of a personal computer or a work station, then the television monitor 2 comprises a display unit of the computer, the image display processor 12 comprises part of the game program data stored in the recording medium 5 or hardware on an extension board inserted in an extension slot of the computer, and the interfaces 9, 10, 13, 14, the D/A converters 17, 18, and the operation information interface 15 comprise hardware on an extension board inserted in an extension slot of the computer. The RAM 8 comprises an area of a main memory or an extension memory of the computer.

In this embodiment, the video game system 1 is described as being constructed as a home game machine.

General operation of the video game system 1 will first be described below.

When the power supply switch (not shown) is turned on to energize the video game system 1, the CPU 6 reads the video data, audio data, and game program data from the recording medium 5 based on the operating system stored in the recording medium 5. The video data, audio data, and game program data which have been read are stored partly or wholly in the RAM 8.

Subsequently, the CPU 6 starts and continues a video game based on the game program data stored in the RAM 8 and instructions entered by the game player through the manual controller 16. Specifically, based on instructions entered by the game player through the manual controller 16, the CPU 6 generates commands as tasks for displaying images and reproducing sounds.

Based on the commands generated by the CPU 6, the signal processor 11 performs calculations to determine the positions of characters in a three-dimensional space (which may be a two-dimensional space), light source calculations, and generation and processing of audio data.

Based on calculated results from the signal processor 11, the image display processor 12 writes image data to be displayed into the RAM 8. The image data stored in the RAM 8 is supplied through the interface 13 to the D/A converter 17, which converts the image data into an analog image signal. The analog image signal is supplied to the television monitor 2, which displays an image based on the supplied analog image signal.

The audio data produced by the signal processor 11 is supplied through the interface 14 to the D/A converter 18, which converts the audio data into an analog audio signal. The analog audio signal is supplied through the amplifier 3 to the speaker 4, which reproduces sounds based on the supplied analog audio signal.

Figure 2:
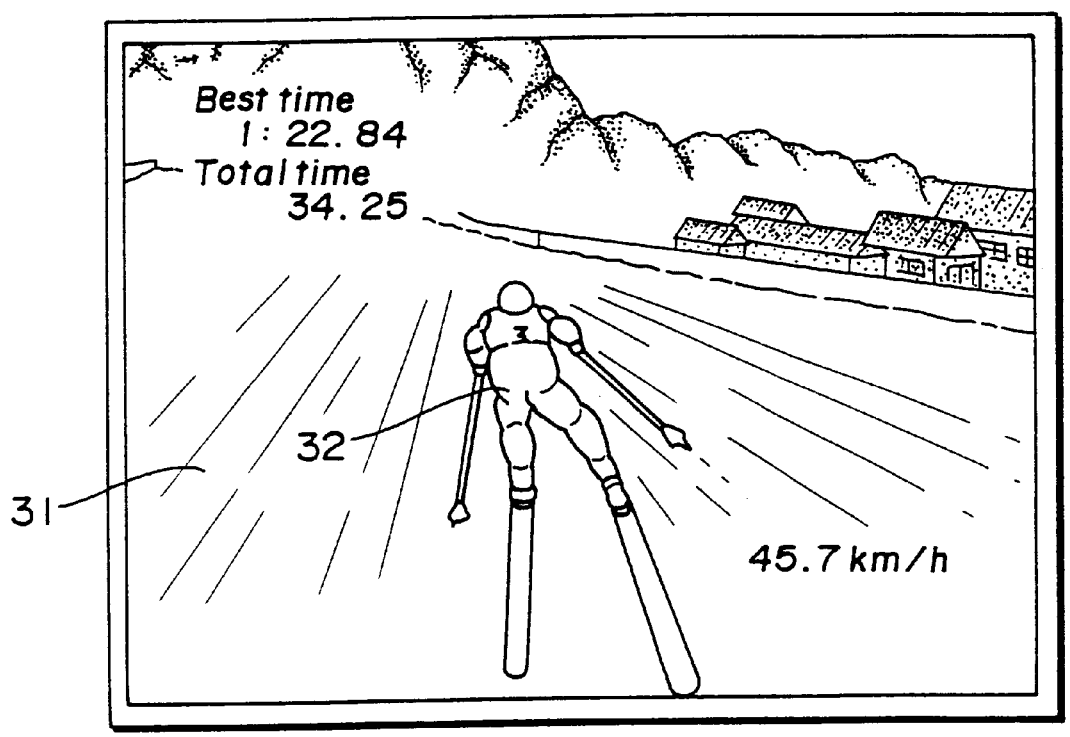
FIG. 2 is a view of a displayed image of a video game played on the video game system shown in FIG. 1.

A game image of a video game played on the video game system 1 will be described below. FIG. 2 shows such a game image displayed on the display screen of the television monitor 2.

In the illustrated embodiment, the video game played on the video game system 1 simulates a downhill race, for example, and a character simulating a downhill racer is displayed on the display screen of the television monitor 2.

In FIG. 2, the displayed game image includes a downhill racer 32 skiing down a course 31 substantially at the center of the game image, a best time at an upper left corner of the game image, a total time of the downhill racer 32 below the best time, and a skiing speed of the downhill racer 32 at a lower right corner of the game image.

On the video game system 1, as is the case with an actual downhill race, the downhill racer skis down the course twice, and its rank is determined on the basis of the total time. One game player plays the video game of a downhill race for a best time, or a plurality of game players alternately operate the manual controller 16 to compete for a shortest course time.

Functions of the CPU 6 will be described below with reference to FIGS. 2 through 4.

Figure 3:
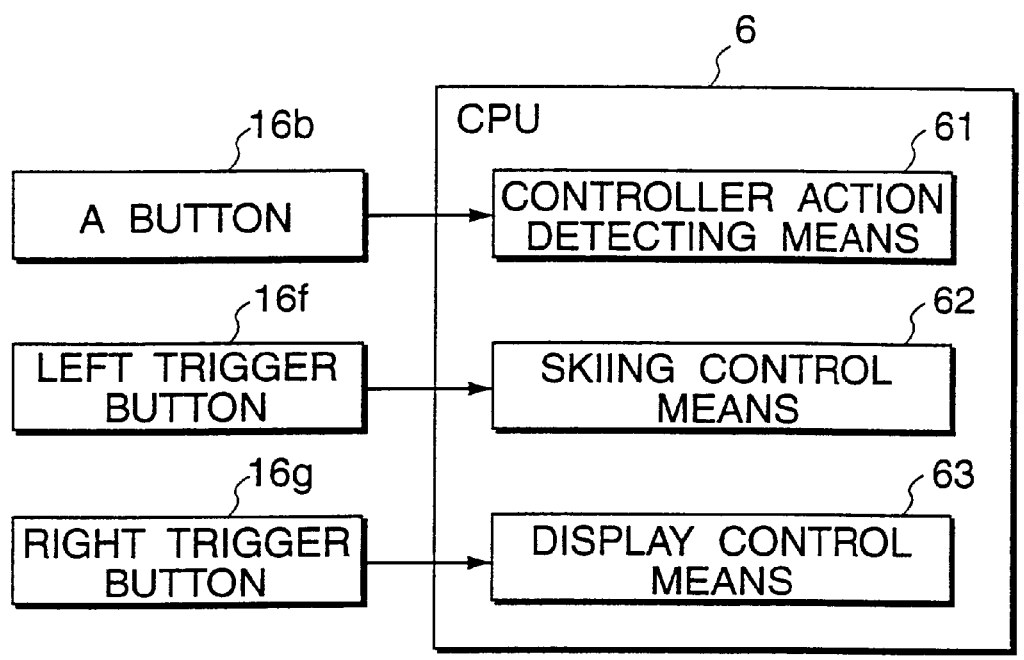
FIG. 3 is a block diagram of functions of a CPU, and buttons of the video game system shown in FIG. 1.

FIG. 3 shows in block form functions of the CPU 6, the A button 16b, and the left and right trigger buttons 16f, 16g. For the sake of brevity, the interface 10, the operation information interface 15, and the bus 7 are omitted from illustration in FIG. 3.

Figure 4:
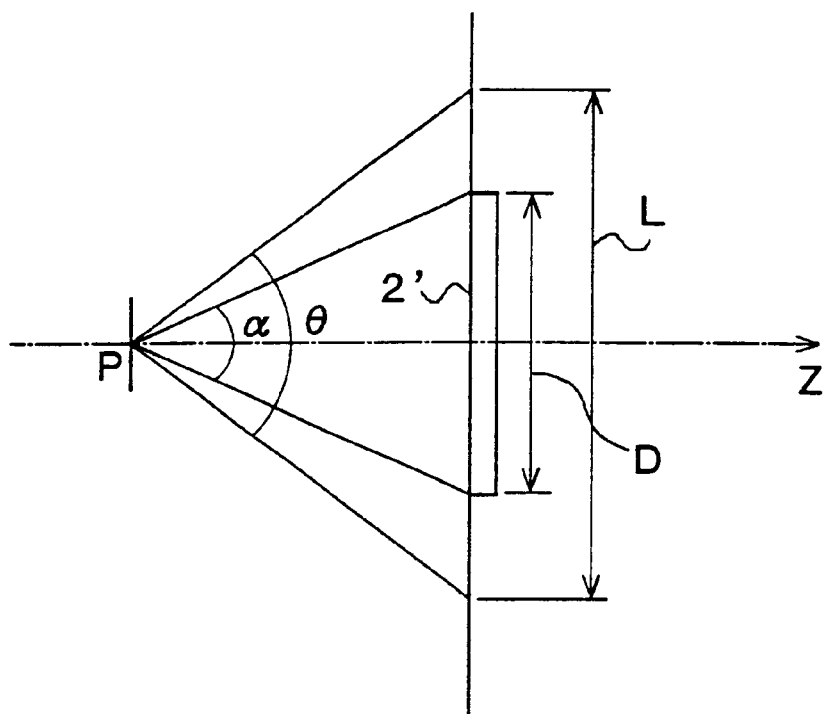
FIG. 4 is a diagram illustrating a combined angle of elevation and depression which is representative of a displayed range of a television monitor.

FIG. 4 illustrates a combined angle of elevation and depression which is representative of a displayed range of the television monitor 2. In FIG. 4, a point P represents a viewpoint behind the downhill racer 32 (see FIG. 2), and a direction Z represents the direction in which the downhill racer 32 moves. The television monitor 2 has a display screen 2' having a vertical dimension D. A combined angle of elevation and depression as viewed from the point P when the downhill racer 32 is at rest is indicated by "α", and a combined angle of elevation and depression as viewed from the point P when the downhill racer 32 is skiing at a certain speed is indicated by "θ".

As shown in FIG. 3, the CPU 6 has as its functions a controller action detecting means 61, a skiing control means 62, and a display control means 63.

The controller action detecting means 61 detects whether each of the A button 16b and the left and right trigger buttons 16f, 16g is pressed or not.

The skiing control means 62 controls the skiing of the downhill racer 32. Specifically, the skiing control means 62 performs the following operations (1)–(3):

(1) When the A button 16b is pressed while the downhill racer 32 is in a ready-to-go condition, the skiing control means 62 applies a skiing start signal to the signal processor 11 to cause the downhill racer 32 to start its skiing action.

(2) When the left trigger button 16f is pressed while the downhill racer 32 is skiing, the skiing control means 62 changes its direction to the left through an angle depending on the period of time in which the left trigger button 16f is continuously pressed. When the right trigger button 16g is pressed while the downhill racer 32 is skiing, the skiing control means 62 changes its direction to the right through an angle depending on the period of time in which the right trigger button 16g is continuously pressed.

(3) The skiing control means 62 calculates a skiing speed of the downhill racer 32 depending on the angle of inclination of the course 31 with respect to the direction of the downhill racer 32, and displays the calculated speed in the-game image on the television monitor 2.

The display control means 63 displays on the television monitor 2 the video image in the game space which includes, as shown in FIG. 2, the course 31 as viewed from the viewpoint placed behind the downhill racer 32 and a background composed of various models.

When the display control means 63 displays the video image on the television monitor 2, it vertically reduces the size of the game space, and reads image data of an image within a vertical range L that subtends the combined angle θ of elevation and depression which is greater than the combined angle α of elevation and depression (α<θ) subtended vertically by the display screen 2' of the television monitor 2, and supplies the read image data to the image display processor 12.

The combined angle θ of elevation and depression is determined according to the equation given below. In order to compress the image data in the vertical range L subtending the combined angle θ of elevation and depression into image data in a vertical range D of the display screen 2', the image data in the vertical range L is vertically decimated at a reduction ratio L/D, and the decimated image data is written in the RAM 8.

$$\theta = \theta_m + V/2$$

where $\theta_m$ represents a preset lower limit value ($\theta_m = \alpha$ and $\theta_m = 60°$ in this embodiment) and V represents the skiing speed (km/h) of the downhill racer 32.

For example, if V=45.7 km/h, then θ60+45.7/2=82.9.

However, if $\theta > \theta_M$, then $\theta = \theta_m$ where $\theta_M$ represents a preset upper limit value ($\theta_M = 90°$, for example, in this embodiment).

The combined angle θ of elevation and depression may be or may be not a combination of equal angles of elevation and depression with respect to the direction Z.

FIG. 5 shows a sequence (subroutine) for establishing a combined angle θ of elevation and depression for a range to be displayed. In FIG. 5, numerals with a prefix "ST" represent step numbers.

First, the combined angle θ of elevation and depression is initialized to the lower limit value $\theta_m$ in step ST100, and then a skiing speed V of the downhill racer 32 is calculated depending on the angle of inclination of the course 31 with respect to the direction of the downhill racer 32 in step ST110. Thereafter, the combined angle θ of elevation and depression is calculated according to the equation: $\theta = \theta_m + V/2$ in step ST120.

It is decided whether $\theta > \theta_M$ or not in step ST130. If $\theta \leq \theta_M$ (NO in step ST130), then the sequence shown in FIG. 5 comes to an end. If $\theta > \theta_M$ (YES in step ST130), then θ is equalized to $\theta_M$ in step ST140, after which the sequence shown in FIG. 5 comes to an end.

The subroutine shown in FIG. 5 is repeated at every frame, i.e., every 1/60 second, and an image vertically reduced in size according to the calculated combined angle θ of elevation and depression is displayed on the display screen 2' of the television monitor 2.

As described above, since an image within the vertical range L subtending the combined angle θ of elevation and depression, which is greater than the vertical range D subtending the combined angle α of elevation and depression subtended vertically by the display screen 2', is vertically compressed and displayed on the television monitor 2, any object displayed on the display screen 2' is made vertically smaller than normal. Therefore, when the viewpoint moves closer to the displayed object, the surface area of the object is enlarged more rapidly than normal, with the result that the game image becomes visually impressive.

Because the combined angle θ of elevation and depression is calculated using the skiing speed V of the downhill racer 32, the downhill racer 32 is displayed so as to appear skiing at speed in the game space. As a result, the displayed game image is made highly realistic.

The video game system 1 may be modified as follows:

(1) Rather than determining a range to be displayed on the display screen based on the calculation of the combined angle θ of elevation and depression, the video game system 1 may have reduction calculating means for reducing the game space, including the background, vertically at a predetermined reduction ratio, and may display a reduced game image based on the reduction achieved by the reduction calculating means. In this case, the reduction ratio may be increased as the skiing speed of the downhill racer increases.

(2) In the illustrated embodiment, the video game system 1 has been described as playing a video game simulating a downhill race. However, the principles of the invention are applicable to a video game system for playing any of various other sport races competing for speed, such as other alpine ski races including a slalom race and a giant slalom race, a snowboard race, a car race, etc.

As described above, the reduction ratio for vertically reducing the game space is established depending on the speed of the downhill racer or character, which moves relatively depthwise in the game space, and the game space is displayed at the established reduction ratio. As the character moves deeply into the game space, the background scenery in front of the character is rapidly expanded, resulting in an impressive game image in which the character appears moving at speed.

Since there is a certain upper limit for the reduction ratio, the game space is prevented from being vertically reduced excessively, and hence the game image is prevented from becoming unduly unnatural.

Although a certain preferred embodiment of the present invention has been shown and described in detail, it should be understood that various changes and modifications may be made therein without departing from the scope of the appended claims.

What is claimed is:

1. A video game system for displaying a character moving in a depthwise direction in a game space, comprising:
    display means for displaying at least a portion of the game space within a vertical display range of the display means;
    speed calculating means for calculating a speed at which the character moves in the game space in the depthwise direction;
    reduction ratio setting means for establishing a reduction ratio to reduce a size of the game space only vertically based on the speed calculated by said speed calculating means and maintaining a horizontal size of the game space regardless of the speed calculated by said speed calculating means; and
    display control means for controlling said display means to display said at least a portion of the game space at said reduction ratio, established by said reduction ratio setting means, whereby said at least a portion of said game space displayed includes a greater area of said game space as said reduction ratio is increased.

2. The video game system of claim 1 wherein the reduction ratio is increased as the speed calculated by said speed calculating means increases whereby the at least a portion of said game space displayed within said vertical display range on said display means includes a greater area of said game space as said reduction ratio is increased and said speed is increased.

3. A video game system for displaying a character moving in a depthwise direction in a game space, comprising:
    display means for displaying at least a portion of the game space within a vertical display range of the display means;
    speed calculating means for calculating a speed at which the character moves in the game space in the depthwise direction;
    reduction ratio setting means for establishing a reduction ratio to reduce a size of the game space only vertically based on the speed calculated by said speed calculating means and maintaining a horizontal size of the game space regardless of the speed calculated by said speed calculating means; and
    display control means for controlling said display means to display said at least a portion of the game space at said reduction ratio set by said reduction ratio setting means.

4. The video game system of claim 3 wherein the reduction ratio is increased as the speed calculated by said speed calculating means increases whereby the at least a portion of said game space displayed within said vertical display range on said display means includes a greater area of said game space as said reduction ratio is increased and said speed is increased.

5. The video game system according to claim 3, further comprising:
    memory means for storing an upper limit for said reduction ratio; and
    said reduction ratio setting means comprising means for using said upper limit as a maximum value for the reduction ratio.

6. A method of controlling display of images in a video game to display a character moving in a depthwise direction in a game space, comprising the steps of:
    displaying at least a portion of the game space within a vertical display range of a display;
    calculating a speed at which the character moves in the game space in the depthwise direction;
    setting a reduction ratio to reduce a size of the game space only vertically based on the speed calculated;
    maintaining a horizontal size of the game space regardless of the speed calculated; and
    displaying said at least a portion of the game space at said reduction ratio.

7. The method of claim 6 wherein the reduction ratio is increased as the speed calculated increases whereby the at least a portion of said game space displayed within said vertical display range includes a greater area of said game space as said reduction ratio is increased and said speed is increased.

8. The method of claim 6, further comprising:
    storing an upper limit for said reduction ratio; and
    using said upper limit as a maximum value for the reduction ratio.

9. A recording medium storing an executable program for controlling display of images in a video game to display a character moving in a depthwise direction in a game space, said program comprising the steps of:
    displaying at least a portion of the game space within a vertical display range of a display;
    calculating a speed at which the character moves in the game space in the depthwise direction;
    setting a reduction ratio to reduce a size of the game space only vertically based on the speed calculated;
    maintaining a horizontal size of the game space regardless of the speed calculated; and
    displaying said at least a portion of the game space at said reduction ratio.

10. The recording medium of claim 9 wherein the reduction ratio is increased as the speed calculated increases hereby the at least a portion of said game space displayed within said vertical display range includes a greater area of said game space as said reduction ratio is increased and said speed is increased.

11. The recording medium of claim 9, said program further comprising the steps of:
    storing an upper limit as a maximum value for the reduction ratio; and
    using said upper limit as a maximum value for the reduction ratio.

* * * * *